June 22, 1965 P. J. METZ, JR 3,190,781
METHOD AND APPARATUS FOR LAMINATING SHEET MATERIAL
Filed May 22, 1962 3 Sheets-Sheet 1
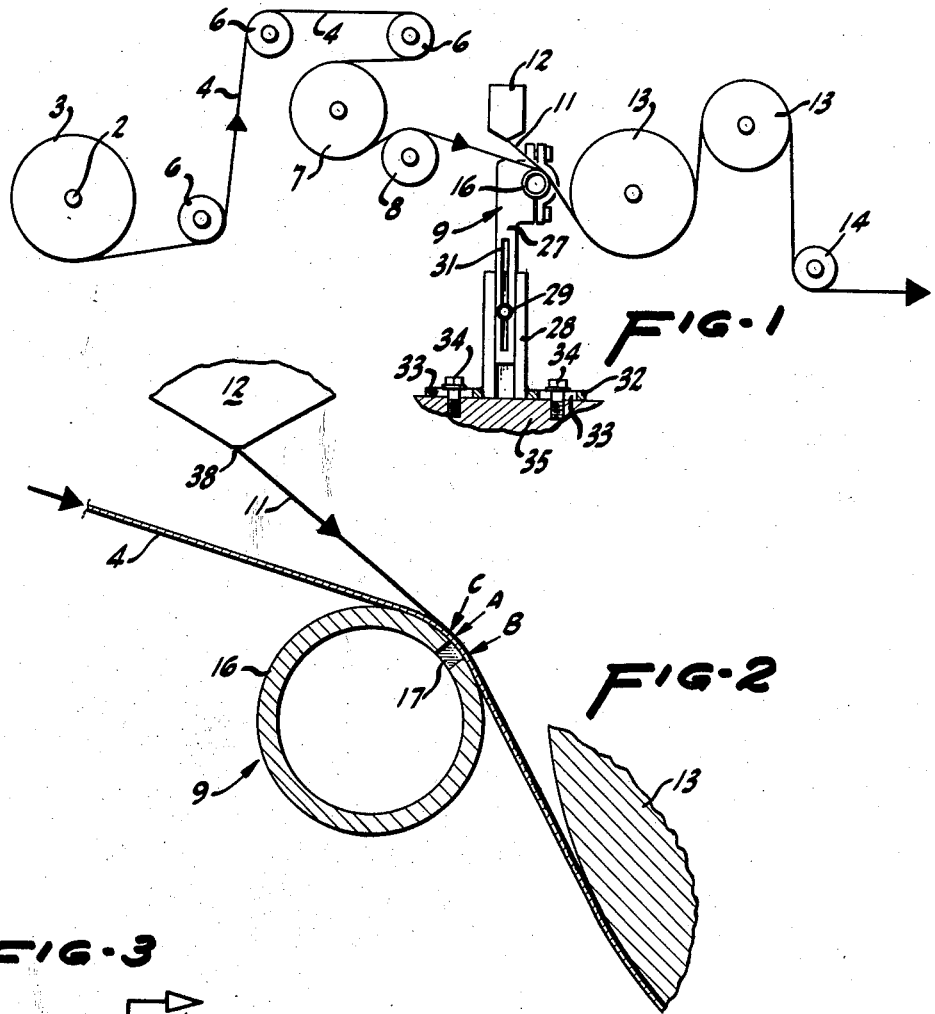
INVENTOR.
PETER J. METZ, JR.
BY Bishop & Schlemmer
ATTORNEYS INVENTOR.
PETER J. METZ, JR.
BY Bialos & Schlemmer
ATTORNEYS June 22, 1965 P. J. METZ, JR 3,190,781
METHOD AND APPARATUS FOR LAMINATING SHEET MATERIAL
Filed May 22, 1962 3 Sheets-Sheet 3

INVENTOR.
PETER J. METZ, JR.
BY
ATTORNEYS

United States Patent Office 3,190,781
Patented June 22, 1965

3,190,781
METHOD AND APPARATUS FOR LAMINATING SHEET MATERIAL
Peter J. Metz, Jr., Castro Valley, Calif., assignor to Crown Zellerbach Corporation, San Francisco, Calif., a corporation of Nevada
Filed May 22, 1962, Ser. No. 196,785
10 Claims. (Cl. 156—244)

This invention relates to laminating flexible sheet material together, and more particularly to adhesively bonding tacky plastic sheet material to a porous flexible web of base material. The invention has found great applicability in the adhesive bonding of polyolefin film, such as polyethylene film, to a base paper web.

In the manufacture of various types of packaging sheets, such as those for forming pouches, bags, and wrappers for various types of products, it is desirable where moisture resistance is required, to coat or line the inner face of the base material, such as paper, with a relatively impermeable plastic sheet material. The plastic sheet is desirably in the form of a relatively thin film which is tacky at an elevated temperature so that it readily bonds adhesively to the base sheet.

Heretofore, it has been common practice to employ heat sealable plastic sheets and effect bonding of the plastic sheet to the flexible base sheet by passing the sheets, after they have been brought together, between the nip of heated pressure rolls to effect the heat sealing. Such method is not all to be desired because the surface of the base sheet, usually paper, is relatively rough with high spots and low spots and the pressure of the rolls causes the high spots to penetrate the plastic sheet, particularly if it is thin plastic film, as it is being adhesively bonded to the base sheet. This, of course, results in small perforations in the plastic sheet through which moisture can permeate.

Summarizing this invention, it is for the purpose of overcoming the foregoing problem. Suction is applied to the under face of a relatively porous base sheet as a relatively impermeable plastic sheet or film having adhesive characteristics is brought into contact with the base sheet by a special method and special form of apparatus which present minimum frictional drag to the continuously moving base sheet and the film thereon. This enables the laminating to be performed at high speeds which is important for economical commercial operations. Because the base sheet or web is porous, a partial vacuum applied to the under face thereof as a tacky sheet is brought into contact with its upper face causes such tacky sheet to be drawn into the valleys between the high spots on the base sheet and onto the high spots to form a strongly and uniformly bonded laminated structure in which the high spots on the base sheet do not penetrate a plastic sheet thus preserving continuity of the plastic sheet.

Generally, the method is accomplished by continuously moving a web of the base sheet in one general direction over a support extending transversely of the moving web and which is of such character as to present minimum frictional drag to the web. A partial vacuum is continuously maintained on the web through a perforate portion of the support which extends transversely of the moving web along a zone which is desirably relatively narrow in the direction of travel of the web. Also, the web is in sealing engagement with the support both ahead of and beyond the vacuum applying zone. As the vacuum is maintained, the plastic sheet, which is desirably thin film extruded in hot molten tacky condition from an extrusion die and in angular relationship with respect to the upper face of the web, is brought into contact with the moving web a slight distance ahead of the vacuum applying zone.

The support for the moving web is desirably relatively narrow in the direction of the travel of the web to present minimum frictional drag. Also, since the vacuum zone is desirably relatively narrow in the direction of travel of the web, the laminated sheet will not be drawn or curl into such zone which would otherwise occur were the perforate vacuum zone relatively wide.

Initial contact of the plastic film should be as close ahead of the vacuum applying zone as is practically possible. If such initial contact were over the vacuum zone, the effect of the vacuum would be lost. If too far ahead of the vacuum zone, the hot tacky extruded film might have an opportunity to cool between the time it contacts the base web and reaches the vacuum zone, and hence might not be drawn into the pores of the porous base web by the vacuum. Contact of the web and film extruded thereon is also maintained with the perforate support a relatively short distance beyond the vacuum applying zone to provide a vacuum seal at such location as well as ahead of the zone.

Broadly, the apparatus includes a tubular support structure which has a narrow perforate portion extending axially thereof; and vacuum is applied to the structure as the flexible base web moves over it. Desirably, the portion of the support over which the web travels is convexly curved or arcuate in form; and the support is so arranged at a relatively fixed location with reference to the moving web as to cause the web to move over it with a convex bend. Hence, the web will be in firm sealing engagement both ahead of and beyond the vacuum applying zone to maintain seals at such locations. In this connection, the outside diameter of the tubular support structure is relatively small to present minimum frictional drag to the moving web.

From the preceding, it is seen that the invention has as its objects, among others, the provision of an improved laminating method and apparatus, which will enable high speed commercial operations, is simple and economical, and will effectively cause uniform bonding of the plastic film to the base sheet. Other objects will become apparent from the following more detailed description.

Reference is now made to the drawings for such more detailed description:

FIG. 1 is a schematic side elevational view of the entire apparatus for effecting the laminating;

FIG. 2 is an enlarged fragmentary longitudinal sectional view of the portion of the apparatus embodying the foregoing tubular support structure and associated extrusion die;

FIG. 3 is a longitudinal sectional view through the tubular vacuum applying and support structure;

FIG. 4 is a transverse vertical section taken in the plane indicated by line 4—4 in FIG. 3;

Figure 5:
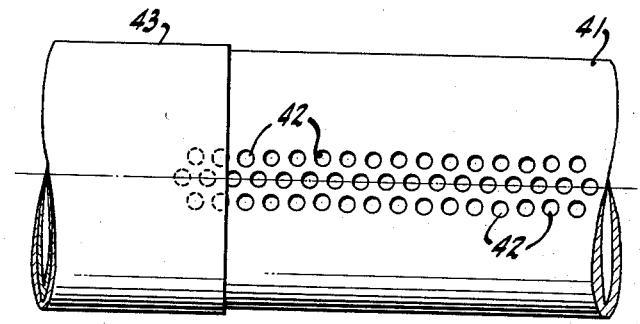
FIG. 5 is a fragmentary plan view illustrating an embodiment which the tubular vacuum applying support structure may assume; apertures in the vacuum applying zone of such embodiment being enlarged for purposes of illustration.

With reference to FIG. 1, the overall apparatus comprises a conventional mandrel 2 for rotatably supporting a master roll 3 of a flexible porous base sheet 4 which is continuously unwound from the master roll by suitable means (not shown) well known in the art. Sheet 4 may be of any porous material, such as paper or woven natural or synthetic fibers. Web 4 passes over idler guide rolls 6 and over a preheating roll 7 which is heated by suitable steam heating means known in the art to preheat the web so as to minimize chilling of the plastic sheet which is subsequently extruded onto the upper face of the web in the form of a hot molten film.

From heater roll 7, web 4 is guided over another idler 8 and then over a tubular support and vacuum applying structure indicated generally by arrow 9 and which will be described later in greater detail. Plastic film 11 is extruded continuously in hot molten tacky state from a conventional extrusion die 12 onto the upper face of web 4 as will also be described in greater detail later. After film 11 becomes adhesively bonded to the base web 4 at the tubular structure 9, the laminated sheet thus formed is conducted over a pair of conventional chill or cooling rolls 13 and thence to another idler 14 to a rewind station (not shown) wherein the laminated sheet is wound into a roll for subsequent use.

As is shown in FIGS. 2 through 4, a desirable form of tubular support and vacuum applying structure comprises a metal tube in the form of a pipe 16 of relatively small outside diameter to provide minimum frictional drag as the web 4 is continuously moved over an upper portion of the tube. Desirably, tube 16 is of any suitable smooth surfaced steel tubing. It can be chromium plated to provide further minmization of fractional drag.

Extending axially of the tube transversely of the direction of travel of the web 4 is a narrow slot 17 which may be formed in any suitable manner such as by milling, leaving small connecting portions or bridges 18 at intervals along the tube which provide strength. These bridges do not extend all the way to the peripheral surface of the tube. Hence, a partial vacuum applied through slot 17 will not be interrupted at such tube surface when web 4 passes thereover. One end of the tube is provided with a connection 19 to a conventional constant displacement vacuum pump 21. At its opposite end, the tube is provided with a conventional manually operable throttle valve 22 to enable adjustable control of the degree or extent of vacuum in the zone defined by slot 17.

As previously mentioned, it is desirable that the extruded film be brought into contact with the upper face of the web 4 as close to the vacuum applying zone defined by slot 17 as possible and not over the slot 17. For this purpose, tube 16 is mounted for angular adjustment in split clamps 23 held together by clamping nuts and bolts 24 which when loosened enable turning of the aforementioned tube angularly to effect the adjustment desired. When the clamping nuts and bolts 24 are tightened, tube 16 is fixedly held with slot 17 in a predetermined angularly adjusted position.

Means is provided to mount tube 16 for both selective vertical and horizontal adjustments to enable the tube to be positioned at a desired fixed location to insure a firm tight seal of the web 4 both ahead of slot 17 and beyond the slot, whereby leakage of the vacuum on the web and film passing over the slot is obviated. Also, such aforementioned adjustments provide control for fixing the curvature of the convex bend imparted to web 4 passing over the tube, to enable the web to ride over a minimum surface area both ahead of and beyond the slot for minimizing frictional drag, and at the same time permit the aforementioned seals.

For this purpose, one of clamps 23 is fixed to an upright bracket 27 mounted for slidable movement in guideway 28. Bracket 27 can be fixedly secured in a predetermined vertically adjusted position by means of screw 29 passing through a slot 31 in the bracket and threaded in guideway 28. Base 32 of guideway 28 is provided with elongated slots 33 permitting limited horizontal slidable movement of the guideway; and screws 34 are provided to fix adjustably the guideway to foundation member 35. A portion of the piping between tube 16 and vacuum pump 21 includes flexible tubing 36 which will permit such adjustments.

With reference to FIG. 1, it is to be understood that the described adjustable supporting means is provided for each end of the tube 16. The particular character of adjusting means described is not important, as any other adjustable mounts may be employed which will provide for angular, vertical and horizontal adjustments of tube 16.

From the preceding, it is seen that as base web 4 passes over substantially uninterrupted slot 17 which forms the perforate vacuum zone extending transversely of the moving web, a partial vacuum is maintained on the under face of the web. The vacuum is effective through the web 4 because of its porosity to cause the extruded film 11 to be drawn into adhesive bonding engagement with the upper face of web 4 inasmuch as the film is in tacky hot molten state as it travels through the space between narrow outlet orifice 38 of the extrusion die and the initial point of contact with web 4 indicated by arrow C in FIG. 2; such point of contact being ahead of the front edge of slot 17 indicated by arrow A.

With respect to extruded polyethylene film, the distance between the outlet orifice 38 and the point of contact C of the film with the upper face of web 4 should be relatively long to allow sufficient time for the film to oxidize in such space as this oxidation enhances bonding strength between the film and an untreated paper web. This distance, which is known in the art as film travel, may vary from 3 to 7 inches for extruded polyethylene film for a web travel of up to 500 ft. per minute, depending upon the rate of travel of the web. The faster the speed of movement of the web, the longer the film travel should be to provide ample time for such oxidation. However, if the upper face of the web is treated with a suitable coating adhesive which enhances bonding strength to polyethylene film, such as any well known type of wax-resin blend, the film travel distance may be relatively short.

As was previously related, web 4 travels in a convex bend or curve over perforate portion 17 of tube 16; and it will be noted with reference to FIG. 2 that it moves downwardly onto the tube at an acute angle with reference to the horizontal. Such convex bend coupled with the tension maintained on the web as it travels, insures good sealing contact of the web with the supporting surface of tube 16 both ahead of the front edge A of slot 17 as well as beyond the rear edge of the slot which is indicated by arrow B. Thus, complete effectiveness of the vacuum without material leakage is insured over the area defined by slot 17. As was previously related, it is desirable that web 4 engage the supporting surface of tube 16 ahead of and beyond slot 17 as short a distance as is practically possible to minimize frictional drag. A suitable length of engagement ahead of the slot is about ⅛ to ½ inch while beyond the slot a suitable length is about ⅜ to ⅝ inch but the maximum length beyond the slot is relatively immaterial as the positioning is such that the web is being pulled off of the tube.

By means of the aforementioned vertical and horizontal adjustments provided for tube 16, the tube can be readily positioned by observation to provide such minimum drag. At the same time, angular adjustment of the tube 16 provides for control of the initial point of contact C of film 11 as the film is extruded at an acute angle with respect to the web. Such distance between the point of contact C and the front edge A of the slot should also be as short as possible to prevent undue cooling of the film before it passes over the suction applying area defined by slot 17. A suitable distance is about 1/16 to 1/2 inch, although this distance is not too critical as long as the point of contact C is as close to slot edge A as is feasible with high speed operating conditions. However, the point of contact C should not be over slot 17 because then the vacuum would not be effective.

Slot 17, which forms the vacuum applying zone, should not be too narrow; otherwise the vacuum might not have sufficient time to be completely effective in forming a strong adhesive bond between the film and the web. On the other hand, the slot should not be too wide with reference to the direction of travel of the web because the vacuum might cause sucking in of the film and web into the slot causing undesirable curling. For most operating conditions, a width of 1/8 to 1/2 inch indicated by the distance between A and B is suitable. For heavier base webs 4 that are more dense than lighter base webs, the width of the slot should be greater than for lighter webs. The extent of partial vacuum is not particularly critical. It should be so adjusted by valve 22 as to produce a good bond. A suitable vacuum is one equivalent to about 7 to 25 inches of mercury; the heavier the sheet the greater the vacuum. A good operating range is about 11 to 14 inches of mercury for commercial grades of kraft paper and molten tacky polyolefin film extruded thereon.

The outside diameter of the tube should be as small as possible so as to present minimum frictional drag. A tube of 2 inch outside diameter has been employed satisfactorily in practical commercial operations but a suitable outside diameter range is 1½ to 4½ inches.

The following is a typical operating example illustrative of the invention for bonding thin polyethylene film to conventional untreated kraft paper. With polyethylene having a density of about 0.930, and a melt index of about 6.5 (Union Carbide DHDA6386-Natural 7), the polyethylene is maintained in the extrusion die at a temperature of about 615° F.; and the paper laminated to the polyethylene is about 40 lb. kraft (weight on the basis of 40 lbs. per ream which is 3,000 sq. ft.). The speed of travel of the web is about 400 ft. per minute. Extrusion die outlet orifice 38 is adjusted to apply about 5 lbs. per ream of the polyethylene to the paper which will form a coating of about 1/3 mil thickness; the tube 16 being adjusted to provide a film travel, namely, the distance between orifice 38 and point C of about 4½ inches.

The outside diameter of tube 16 is about 2 inches; slot 17 is ¼ inch in width in the direction of travel of the web and the degree of vacuum is adjusted to be equivalent to about 12 inches of mercury. The initial point of contact C of film 11 with web 4 is about 1/16 inch ahead of the slot edge A. Web 4 engages the support surface of tube 16 about ½ inch ahead of slot 17 and about the same distance beyond the slot.

Desirably, the preheating roll 7 is at a temperature of about 280° F. to preheat the paper to about 200° F. In this connection, the preheating of the paper web should for best results be such as not to reduce the moisture content of the paper to less than about 6% by weight. However, the preheating temperature is not particularly critical, as the preheating roll temperature may vary from about 260° to 320° F. Cooling rolls 13 are conventional water cooled rolls; and are desirably maintained warm at a temperature of about 90° F. because good adhesion of the film to the paper web is obtained at about this temperature.

The above is an illustrative example for particular conditions of extruded polyethylene and film thickness, weight of paper, and operating speed. However, the method and apparatus hereof can be readily adjusted in accordance with the factors explained above, merely by observation on the part of the operator, for different types of tacky sheets, porous flexible webs to be coated, and different operating speeds. The operator can readily initially observe what particular conditions produce the strongest bond, and then operate continuously accordingly.

Means is provided for adjusting the effective length of slot 17, in accordance with the width of web being laminated comprising a sleeve 39 slidably mounted for axial movement along the tube 16. The sleeve can be conveniently made of any flat piece of smooth thin material tubed about the pipe 16 to provide a tight sliding fit, the adjacent ends of which are secured together after the sleeve has been placed in position. A suitable stock for sleeve 39 is highly polished brass of relatively thin gauge, desirably about 0.0037", with soldered meeting ends.

FIG. 5 illustrates an embodiment which can be substituted for the tube 16 of FIGS. 2 and 3 for laminating an extremely thin base web. Such web might tend to curl into a substantially continuous slot even if it is relatively narrow but the construction of FIG. 5 minimizes such possibility. In such embodiment, the vacuum applying zone of pipe 41 is formed by a multiplicity of small apertures 42 in the pipe extending axially therealong; the apertures being arranged in staggered off-set relationship so that all portions of the web and tacky sheet passing over the vacuum applying zone will be subjected to the vacuum.

As illustrative of the staggered pattern, a suitable size of the apertures is about 3/32 of an inch in diameter off-set on centers of about 9/32 inch apart. Thus, substantially all portions of the web and tacky sheet being laminated thereto will be brought into bonding contact over the vacuum applying zone. As with respect to the previously described construction, a slidable sleeve 43 is desirably provided over tube 41 to enable adjustment of the effective length of the vacuum applying zone.

Figure 7:
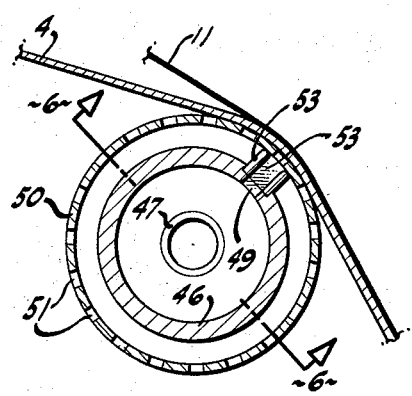
FIG. 7 is a transverse vertical section taken in a plane indicated by the line 7—7 in FIG. 6.
Figure 6:
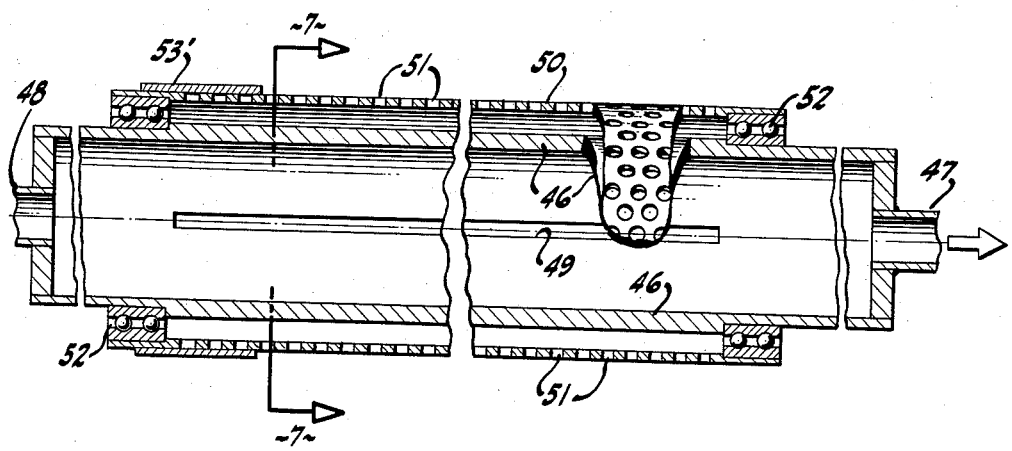
FIG. 6 is a longitudinal sectional view, partly in elevation, illustrating an additional embodiment of tubular support structure and vacuum applying means with portions of the structure broken away to shorten the view; the plane of the section being indicated by line 6—6 in FIG. 7.

If the base web of material has been printed on its under face, such printing might become marred as a result of frictional drag over the fixed surface of tubes 16 and 41 of the previously described modifications. FIGS. 6 and 7 illustrate a modification wherein frictional drag is entirely obviated but the same time, a tubular support structure is provided for enabling application of the vacuum along the relatively narrow zone of the character previously related; all other functional features being the same as that previously described.

In such a modification, a fixed pipe 46 is provided and is supported in the same manner as pipes 16 and 41. It is provided at one end with connection 47 to a vacuum pump as previously described. At its other end 48, a throttle valve (not shown) is provided to control the degree of vacuum.

Tube 46 is formed with narrow slot 49 which is functionally the same as the previously described slot 17 and apertures 42. Rotatably mounted on tube 46 is a cylindrical sleeve 50 formed with a multiplicity of small apertures 51 extending substantially the entire length of and completely about the periphery of sleeve 50. To provide the rotatable mounting, sleeve 50 is journalled for rotation about suitable anti-friction ball bearings 52 adjacent the ends thereof, and which support the sleeve 50 in spaced relation with respect to the outer surface of tube 46.

To seal off all the space between tube 46 and sleeve 50 along the perforate edges of the vacuum zone 49, sealing walls 53 are provided along the respective opposite side and end edges of slot 49. These walls form a tube fixedly secured to pipe 46 and which is in frictional engagement with the under surface of sleeve 50. As base web 4 is moved over the described vacuum applying support structure therefor, sleeve 50 rotates thus obviating frictional drag which might otherwise possibly mar printing.

At the same time, the portions of sheet 11 and web 4 passing over vacuum zone 49 are subjected to the partial vacuum to effect the above described adhesive bond as the tacky sheet 11 is moved onto the upper face of web 4. The dimensions of slot 49 and points of contact described with reference to FIGS. 2 and 3 are also applicable to the modification of FIGS. 5 and 6. As with respect to the previously described modifications an axially adjustable sleeve 53' is preferably slidably mounted on sleeve 50.

Figure 8:
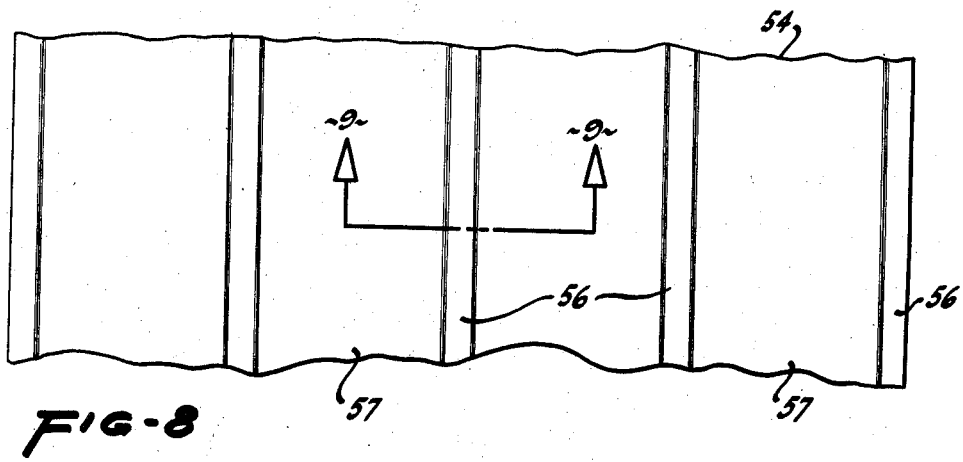
FIG. 8 is a fragmentary plan view of a flexible so-called strip laminate comprising a flexible base sheet and a flexible plastic film adhesively bonded to the base sheet along spaced apart strips or zones.
Figure 9:
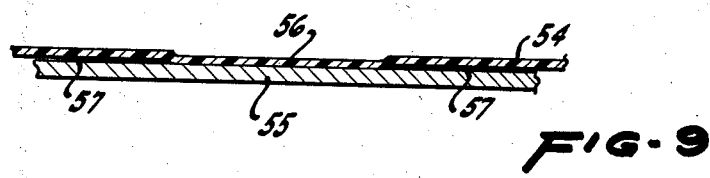
FIG. 9 is a fragmentary enlarged vertical section taken in the plane indicated by line 9—9 in FIG. 8.
Figure 10:
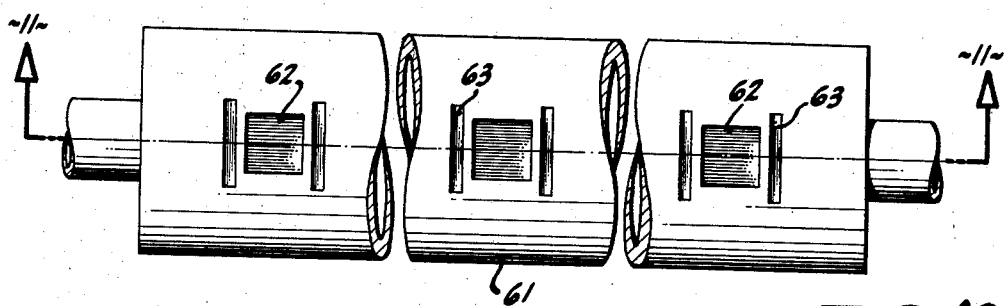
FIG. 10 is a plan view of a form of tubular support and suction applying means structure for effecting the strip lamination shown in FIG. 8; parts being shown broken away to shorten the view.
Figure 11:
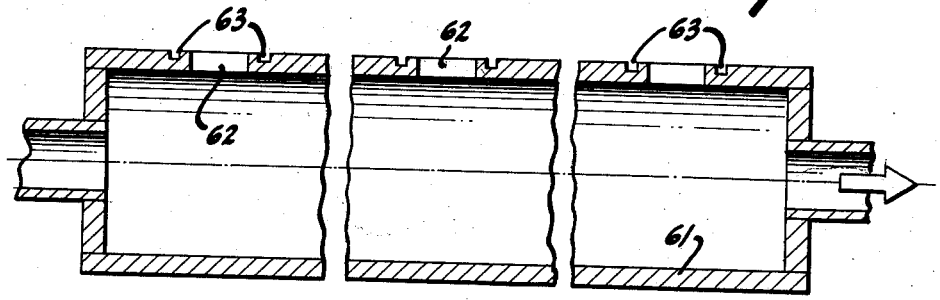
FIG. 11 is a vertical section taken in the plane indicated by the line 11—11 in FIG. 10.

In some cases, it may be desired to effect so-called strip lamination between an initially tacky flexible sheet 54 and flexible base web 55 in the manner shown in FIGS. 8 and 9 wherein the sheet 54 is adhesively bonded to base web 55 along spaced apart strips 56 with the portions 57 of the sheets between such strips in free or unadhered condition as is shown in FIG. 9.

The principles of the method and apparatus of this invention lend themselves admirably to strip lamination. Such arrangement is essentially the same as that described with reference to FIGS. 2 and 3. However, the tube 61 over which the web 55 passes in the manner previously described, is provided with a plurality of spaced apart narrow suction applying zones 62. Web 55 is conducted over these zones in the same manner described with respect to the web 4 in FIGS. 2 and 3.

Thus, when subjected to the partial vacuum applied to the tube 61, the tacky sheet 54 directed onto the upper face of web 55 will become adhesively bonded thereto only along the widths defined by slots 62. In this connection, FIG. 8 illustrates the strip laminated sheets trimmed slightly by cutting along their outside edges, to even those edges because during the laminating operation, such edges are normally difficult to match precisely.

To avoid possible vacuum leakage along the side edges of the respective slots 62, it is desirable to provide relief grooves 63 closely adjacent such edges. A depth of about 1/16 inch and a width of about 1/16 inch are suitable for such grooves, although these dimensions are not critical. Otherwise, the arrangement is substantially the same as that previously described.

I claim:

1. The continuous method of laminating a flexible tacky sheet onto a flexible porous web which comprises providing a relatively narrow tubular structure having a convex curved portion and perforate portion therein, continuously moving and guiding said porous web in a convex bend over said curved portion into contact with said curved portion at locations both ahead of and beyond said perforate portion to provide vacuum seals at such locations, continuously moving said tacky sheet in angular relationship with respect to and into contact with the upper face of said porous web at a location on said convex bend closely adjacent to and ahead of said perforate portion, and continuously maintaining a partial vacuum in said tubular structure to act against the underside of said porous web through said perforate portion to effect adhesive bonding of said tacky sheet to said porous web as they move continuously together over said perforate portion.

2. Apparatus for laminating a flexible tacky sheet onto a porous web moving continuously in one general direction comprising a tubular structure having a perforate portion extending in a direction axially thereof, means for continuously guiding the moving web over said perforate portion and into engagement with said structure both ahead of and beyond said perforate portion, means for maintaining a partial vacuum in said structure acting on said web through said perforate portion, and means for continuously depositing said tacky sheet onto said moving web adjacent to and ahead of said perforate portion.

3. Apparatus for laminating flexible plastic film onto a porous web moving continuously in one general direction comprising a tubular structure having a convex curved portion and a perforate portion extending in a direction axially thereof, means for continuously guiding the moving web in a convex bend over said perforate portion and into engagement with said curved portion both ahead of and beyond said perforate portion, means for maintaining a partial vacuum in said structure acting on said web through said perforate portion, an extrusion die for continuously extruding plastic film onto said moving web adjacent to and ahead of said perforate portion, and means mounting said tubular structure for angular adjustment.

4. Apparatus for laminating flexible plastic film onto a porous web moving continuously in one general direction comprising a tubular structure having a convex curved portion and a perforate portion extending in a direction axially thereof, means for continuously guiding the moving web in a convex bend over said perforate portion and into engagement with said curved portion both ahead of and beyond said perforate portion, means for maintaining a partial vacuum in said structure acting on said web through said perforate portion, an extrusion die for continuously extruding plastic film onto said moving web closely adjacent to and ahead of said perforate portion, means mounting said tubular structure for angular adjustment, and means mounting said tubular structure for vertical and horizontal adjustments.

5. The apparatus of claim 2 wherein said tubular structure comprises a tube, and said perforate portion is in the form of a substantially uninterrupted slot.

6. The apparatus of claim 2 wherein the perforate portion comprises a plurality of spaced apart slots to effect lamination of said film to said web along spaced apart strips.

7. The apparatus of claim 2 wherein said perforate portion comprises a plurality of individual apertures arranged in staggered relationship.

8. The apparatus of claim 2 wherein a sealing sleeve is mounted on said tubular structure for axial slidable movement therealong to adjust the effective length of said perforate portion.

9. The apparatus of claim 2 wherein said tubular structure comprises a tube, a sleeve about said tube having a multiplicity of perforations therein extending substantially the length of and substantially about the entire periphery thereof, means for journalling said sleeve for rotation about said tube and in spaced relationship with respect thereto, said tube having said perforate portion, and sealing means about said perforate portion in frictional engagement with said sleeve.

10. The apparatus of claim 2 wherein said tubular portion is a tube having an outside diameter of about 1½ to 4½ in., and said perforate portion is a substantially uninterrupted slot having a width in the direction of travel of said web of about ⅛ to ½ in.

References Cited by the Examiner
UNITED STATES PATENTS

| | | | |
|---|---|---|---|
| 2,944,586 | 7/60 | Yanulis | 156—244 |
| 3,043,738 | 7/62 | Demeter et al. | 156—244 XR |
| 3,165,432 | 1/65 | Plaskett. | |

FOREIGN PATENTS

| | | |
|---|---|---|
| 123,758 | 6/45 | Australia. |

EARL M. BERGERT, *Primary Examiner.*

HAROLD ANSHER, *Examiner.*